United States Patent
Kurimoto et al.

(10) Patent No.: US 7,607,682 B2
(45) Date of Patent: Oct. 27, 2009

(54) AIRBAG SYSTEM

(75) Inventors: Takeshi Kurimoto, Shiga (JP); Akifumi Takedomi, Yokaichi (JP)

(73) Assignee: Takata Corporation, Tokyo (JP)

( * ) Notice: Subject to any disclaimer, the term of this patent is extended or adjusted under 35 U.S.C. 154(b) by 1387 days.

(21) Appl. No.: 10/690,748

(22) Filed: Oct. 23, 2003

(65) Prior Publication Data

US 2004/0130127 A1    Jul. 8, 2004

(30) Foreign Application Priority Data

Jan. 30, 2003  (JP) ............................. 2003-022367
Jul. 4, 2003   (JP) ............................. 2003-192136
Sep. 17, 2003  (JP) ............................. 2003-324877

(51) Int. Cl.
*B60R 21/26* (2006.01)
(52) U.S. Cl. ................................... 280/729; 280/730.2
(58) Field of Classification Search ................ 280/729, 280/730.2, 743.1, 743.2
See application file for complete search history.

(56) References Cited

U.S. PATENT DOCUMENTS

| | | | |
|---|---|---|---|
| 5,464,250 A | | 11/1995 | Sato |
| 5,586,782 A | * | 12/1996 | Zimmerman et al. ...... 280/730.2 |
| 5,692,774 A | | 12/1997 | Acker et al. |
| 5,791,685 A | * | 8/1998 | Lachat et al. ............ 280/743.1 |
| 5,848,804 A | | 12/1998 | White, Jr. et al. |
| 5,853,191 A | * | 12/1998 | Lachat .................... 280/730.2 |
| 5,899,490 A | * | 5/1999 | Wipasuramonton et al. ..................... 280/730.2 |
| 5,906,391 A | | 5/1999 | Weir et al. |
| 6,032,977 A | | 3/2000 | Reh et al. |
| 6,062,594 A | | 5/2000 | Asano et al. |
| 6,142,517 A | | 11/2000 | Nakamura et al. |
| 6,231,069 B1 | * | 5/2001 | Yokoyama ............... 280/730.2 |
| 6,349,964 B1 | | 2/2002 | Acker et al. |
| 6,561,539 B1 | * | 5/2003 | Sunabashiri et al. ...... 280/730.1 |
| 6,616,177 B2 | * | 9/2003 | Thomas et al. .............. 280/729 |
| 2005/0134021 A1 | * | 6/2005 | Acker et al. ............. 280/728.2 |

FOREIGN PATENT DOCUMENTS

| | | |
|---|---|---|
| JP | 5-4553 | 1/1993 |
| JP | 5-131889 | 5/1993 |
| JP | 8-67228 | 3/1996 |
| JP | 9-39710 | 2/1997 |
| JP | 3038479 | 4/1997 |
| JP | 9-136595 | 5/1997 |
| JP | 10-175499 | 6/1998 |
| JP | 10-181498 | 7/1998 |
| JP | 10-273010 | 10/1998 |
| JP | 2000-85515 | 3/2000 |
| JP | 2001-520604 | 10/2001 |
| JP | 2002-145003 | 5/2002 |

* cited by examiner

*Primary Examiner*—Glenn Dayoan
*Assistant Examiner*—Drew Brown
(74) *Attorney, Agent, or Firm*—Manabu Kanesaka

(57) ABSTRACT

An airbag system includes an airbag having an occupant side surface facing an occupant and an opposite side surface facing a vehicle body in an inflated state, and having an interior partitioned into a plurality of chambers including at least an upper chamber and a lower chamber; a gas generator disposed in the airbag; and a gas distributor having a discharge port for discharging gas from the gas generator into at least the upper chamber and the lower chamber. The gas distributor has a gas-distributing connecting line extending substantially linearly for connecting the occupant side surface and the opposite side surface of the airbag.

9 Claims, 5 Drawing Sheets

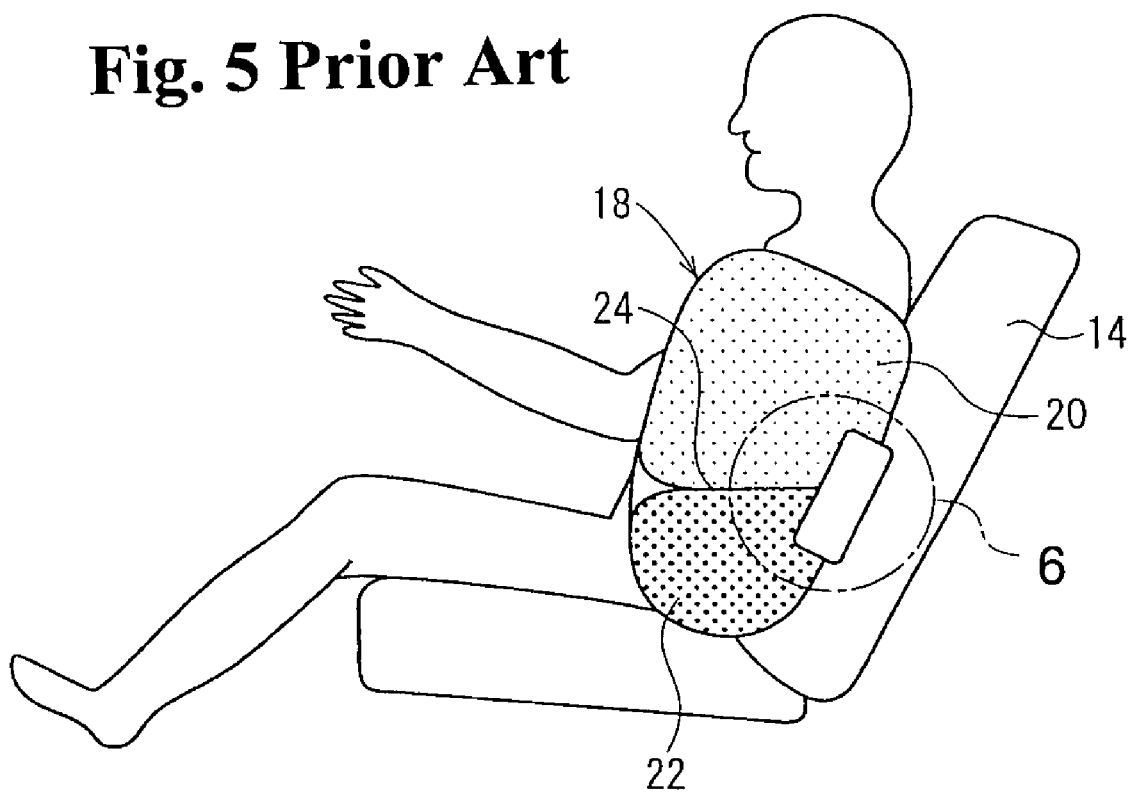

AIRBAG SYSTEM

BACKGROUND OF THE INVENTION AND RELATED ART STATEMENT

The present invention relates to an airbag system for protecting an occupant of a vehicle such as an automobile in the event of a crash. More particularly, the present invention relates to an airbag system including an airbag having an interior partitioned into a plurality of chambers.

A conventional airbag system is constructed to inflate an airbag toward an occupant by a gas generator so that the inflated airbag receives a body of the occupant. Japanese Patent Publication (Kokai) No. 2000-177527 has disclosed a structure in which a lower part of an airbag is inflated at a higher inner pressure than that of an upper part for receiving a lumbar part of the occupant. FIG. 5 is a side view of a seat equipped with the airbag system. FIG. 6 is an enlarged sectional view of a section 6 of the side airbag system shown in FIG. 5.

An airbag 18 is partitioned into an upper chamber 20 and a lower chamber 22 with a seam 24. A rear end of the seam 24 is positioned slightly away from a rear rim of the airbag 18. A cylindrical gas distributor 30 is placed in a space between the rear end of the seam 24 and the rear rim of the airbag 18. A rod-like gas generator 36 is placed in the gas distributor 30. Upper and lower ends of the gas distributor 30 are formed with pipe clips 32 and 34 for fixing the gas generator 36. The pipe clips 32 and 34 seal a portion between the gas generator 36 and the gas distributor 30. The pipe clips 32 and 34 are attached to mounting sections 26 of a seat back 14.

The gas distributor 30 has upper-chamber discharge ports 42 for discharging gas from the gas generator 36 into the upper chamber 20, and lower-chamber discharge ports 44 for discharging the gas into the lower chamber 22. The lower-chamber discharge ports 44 are larger than the upper-chamber discharge ports 42. Therefore, when the gas generator 36 is activated, the airbag 18 is inflated so that the upper chamber 20 has an inner pressure about 0.5 bar and the lower chamber 22 has an inner pressure about 1.5 bars.

The side airbag system disclosed in Japanese Patent Publication (Kokai) No. 2000-177527 includes the gas distributor 30, thereby increasing a cost. In the side airbag system, the discharge ports 42 and 44 are directed forward of the seat. Accordingly, the gas from the gas generator 36 first inflates the airbag 18 forward of the seat and then inflates the airbag 18 vertically, so that the airbag 18 is inflated vertically later.

In view of the problems described above, an object of the present invention is to provide an airbag system with a simple structure at a low cost.

It is another object of the present invention to provide an airbag system in which the airbag is quickly inflated vertically.

Further objects and advantages of the invention will be apparent from the following description of the invention.

SUMMARY OF THE INVENTION

According to the present invention, an airbag system includes an airbag having an occupant side surface facing an occupant and an opposite side surface facing a vehicle body in an inflated state, and having an interior partitioned into a plurality of chambers including at least an upper chamber and a lower chamber; a gas generator disposed in the airbag; and a gas distributor having a discharge port for discharging gas from the gas generator into at least the upper chamber and the lower chamber. The gas distributor has a gas-distributing connecting line extending linearly for connecting the occupant side surface and the opposite side surface of the airbag.

In the present invention, the airbag system has the gas distributor constructed by connecting the occupant side surface and the opposite side surface of the airbag. Accordingly, it is not necessary to provide a separate gas distributor, thereby making the airbag system simple and easy to produce. The airbag system of the invention protects the occupant in case of a side collision as well as roll over.

According to the invention, the gas-distributing connecting line extends vertically, and a gas generator housing chamber is formed between the gas-distributing connecting line and a side rim of the airbag. The housing chamber has a gas discharge port communicating with the lower chamber downwardly at a lower end thereof. The lower-chamber discharge port is larger than an upper-chamber discharge port.

In the present invention, the side airbag system has the lower-chamber discharge port directed downwardly. Therefore, when the gas generator is activated, the airbag is inflated downwardly quickly. Also, the lower-chamber discharge port is larger than the upper-chamber discharge port. Therefore, the lower chamber is inflated at a higher inner pressure than that of the upper chamber at an early stage of the inflation. In this case, the gas generator may be formed in a rod shape having a gas jet port at one end thereof, and may be disposed in the housing chamber with the gas jet port arranged downwardly. With such an arrangement, the gas generator ejects the gas easily into the lower chamber to inflate the lower chamber early.

According to the invention, the housing chamber may be arranged between the upper chamber and the side rim of the airbag. Accordingly, it is possible to increase a capacity of the lower chamber. The housing chamber may extend vertically along the side rim of the airbag, so that the gas generator inflates the housing chamber to deploy the airbag upward quickly.

According to the invention, a lower part of the gas-distributing connecting line may be positioned close to the side rim of the airbag. Accordingly, it is possible to control an amount of the gas supplied to the lower chamber and the upper chamber.

According to the invention, the airbag may be partitioned into a plurality of chambers with a partitioning connecting line extending linearly and connecting the occupant side surface and the opposite side surface. The gas-distributing connecting line and the partitioning connecting line may be overlapped. Accordingly, it is possible to make the airbag system further simple and easy to produce.

BRIEF DESCRIPTION OF THE DRAWINGS

FIG. 5 is a side view of a conventional airbag system;

DETAILED DESCRIPTION OF PREFERRED EMBODIMENTS

Figure 1:
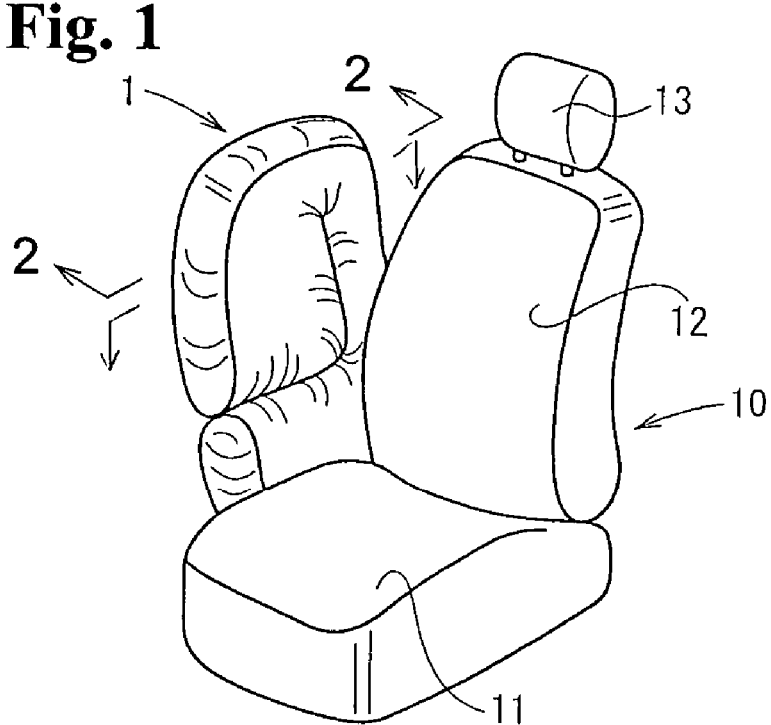
FIG. 1 is a perspective view of a vehicle seat equipped with an airbag system according to an embodiment of the present invention.
Figure 2A:
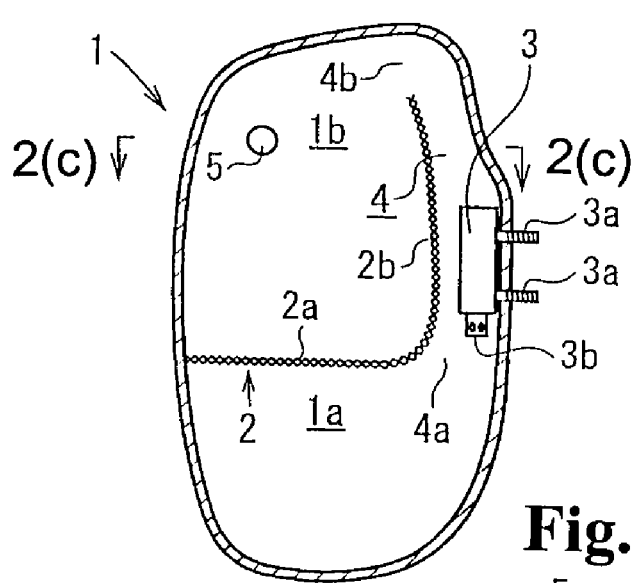
FIG. 2(a) is a sectional view of the airbag taken along line 2-2 in FIG. 1.
Figure 2B:
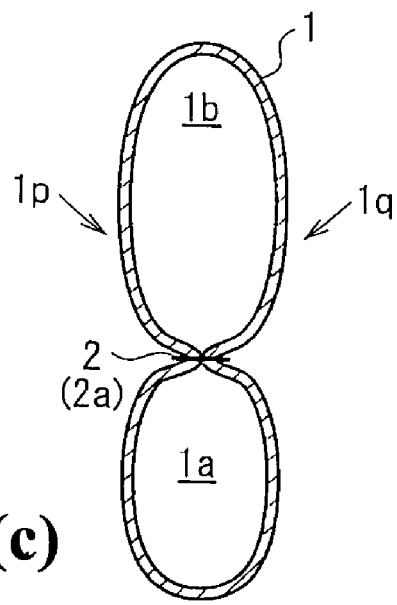
FIG. 2(b) is a sectional view of the airbag taken along line 2(b)-2(b) in FIG. 2(a)
Figure 2C:
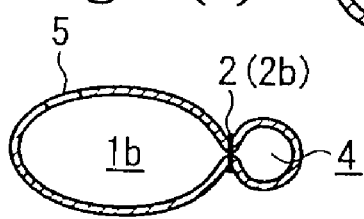
FIG. 2(c) is a sectional view of the airbag taken along line 2(c)-2(c) in FIG. 2(a)

Hereunder, embodiments of the present invention will be described with reference to the accompanying drawings. FIG. 1 is a perspective view of a vehicle seat equipped with an airbag system according to an embodiment of the present invention. FIG. 2(a) is a sectional view of the airbag taken along line 2(a)-2(a) in FIG. 1, FIG. 2(b) is a sectional view of the airbag taken along line 2(b)-2(b) in FIG. 2(a), and FIG. 2(c) is a sectional view of the airbag taken along line 2(c)-2(c) in FIG. 2(a).

As shown in FIG. 1, an airbag 1 is inflated along a window side of a seat 10. The seat 10 includes a seat cushion 11, a seat back 12, and a headrest 13. A casing (not shown) of the airbag system is provided at a side of the seat back 12, in which the airbag 1 is housed in a folded state and covered with a module cover (not shown).

The airbag 1 is formed such that a sheet such as a cloth and a resin sheet (cloth in the embodiment) is formed in a bag shape. An interior of the airbag 1 is partitioned into a lower chamber 1a and an upper chamber 1b with a linear connecting portion (a seam 2 in this embodiment). The seam 2 connects an occupant side surface 1p of the airbag 1 and an opposite side surface 1q together. The seam 2 has a substantially L-shape having a substantially horizontal section 2a and a vertical section 2b.

As shown in FIG. 2(a), the vertical section 2b of the seam 2 extends vertically and is positioned slightly away from a rear end of the airbag 1. A vertically extending housing chamber 4 is formed at a portion between the vertical section 2b and the rear rim of the airbag 1. A front end of the horizontal section 2a of the seam 2 is connected to a front rim of the airbag 1.

The housing chamber 4 houses a rod-shaped gas generator 3. A longitudinal direction of the gas generator 3 is aligned in a vertical direction. The gas generator 3 includes gas jet ports 3b at a lower end thereof. Two stud bolts 3a project from the gas generator 3 backward of the airbag 1 through the rear rim of the airbag 1. The stud bolts 3a are fastened to the casing of the airbag system with nuts. With this arrangement, the gas generator 3 and the airbag 1 are fixed to the casing.

As shown in FIG. 2(a), a clearance for a gas passage is provided between an outer circumference of the gas generator 3 and the vertical section 2b of the seam 2. A gas discharge port 4a is provided at a lower end of the housing chamber 4 between a rear end of the horizontal section 2a and the rear rim of the airbag 1, and opens downwardly into the lower chamber 1a. A gas discharge port 4b is provided at the upper end of the housing chamber 4 between an upper end of the vertical section 2b and an upper rim of the airbag 1, and opens forward into the upper chamber 1b. The upper chamber 1b includes a vent hole 5.

In the airbag system with such a structure, when a vehicle receives an impact or rolls over, the gas generator 3 ejects the gas. The gas flows into the lower chamber 1a and the upper chamber 1b from the gas discharge ports 4a and 4b to inflate the lower chamber 1a and the upper chamber 1b, respectively. Thus, the airbag 1 deploys along the window side of the seat 10, as shown in FIG. 1.

In the airbag system, the housing chamber 4 extends vertically, and the lower-chamber discharge port 4a is directed downwardly. Also, the gas jet ports 3b are arranged downwardly in the vicinity of the lower-chamber discharge port 4a. Therefore, when the gas generator 3 is activated, the lower chamber 1a of the airbag 1 is first inflated quickly, then the housing chamber 4 deploys vertically quickly, and thereafter the upper chamber 1b is inflated.

The lower gas-discharge port 4a has a size larger than that of the upper gas-discharge port 4b. Accordingly, a larger amount of the gas is supplied to the lower chamber 1a at a higher pressure than that in the upper chamber 1b. Furthermore, the gas jet ports 3b of the gas generator 3 are arranged at the lower end of the gas generator 3. Accordingly, it is possible to supply a larger amount of the gas to the lower chamber 1a at a higher pressure. As a result, the lower chamber 1a is inflated early at a high inner pressure to receive a lateral movement of the lumbar part of the occupant. The upper chamber 1b is inflated at a lower inner pressure than that of the lower chamber 1a, thereby receiving an upper part of the occupant softly.

According to the invention, it is possible to make the arrangement simple in which the lower chamber 1a, the upper chamber 1b, and the housing chamber 4 are partitioned with seam 2, thereby making it easy to produce.

Figure 3A:
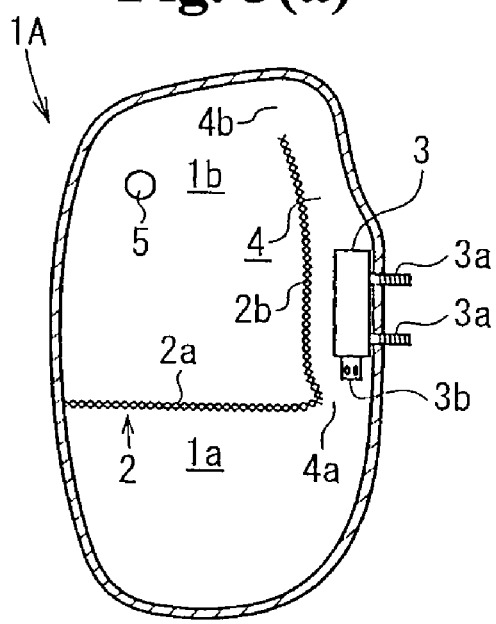
FIGS. 3(a) and 3(b) are sectional views of airbags according to other embodiments of the invention.
Figure 3B:
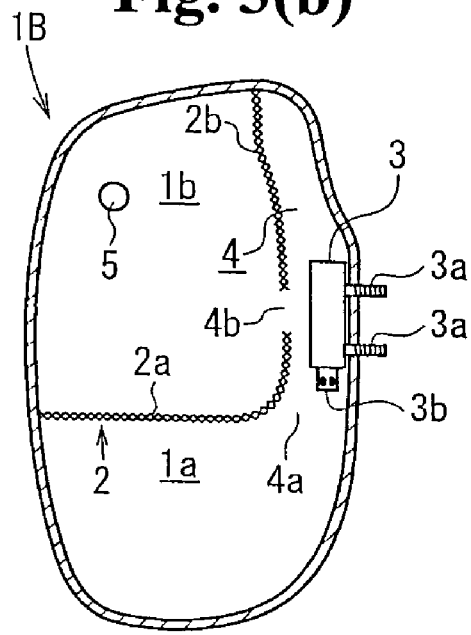

FIGS. 3(a) and 3(b) are sectional views of side airbag systems according to other embodiments of the invention, respectively. In an airbag 1A shown in FIG. 3(a), the gas discharge port 4a of the seam 2 (a connecting section of the horizontal section 2a and the vertical section 2b) closely contacts the rear rim of the airbag 1A. Accordingly, the gas discharge port 4a connecting to the lower chamber 1a has an opening smaller than that in FIG. 2.

With this arrangement, it is possible to control an inflation speed and an inner pressure of the lower chamber 1a by adjusting a distance between the seam 2 and the airbag 1A. It is also possible to change a size of the gas discharge port 4b to control an inflation speed and an inner pressure of the upper chamber 1b and the lower chamber 1a by adjusting a distance between the upper end of the vertical section 2b of the seam 2 and the upper rim of the airbag 1 (not shown). In the embodiment, the gas discharge port 4b may be disposed in the middle of the vertical section 2b of the seam 2, as in an airbag 1B shown in FIG. 3(b).

In the embodiments described above, the airbags 1, 1A, and 1B are partitioned into two chambers, i.e. the upper chamber 1b and the lower chamber 1a. Alternatively, the airbags 1, 1A, and 1B may be partitioned into three or more chambers.

Figure 4A:
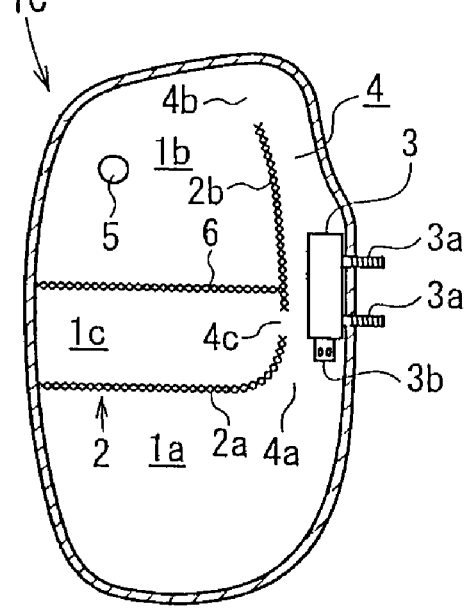
FIGS. 4(a) and 4(b) are sectional views of airbags according to further embodiments of the invention.
Figure 4B:
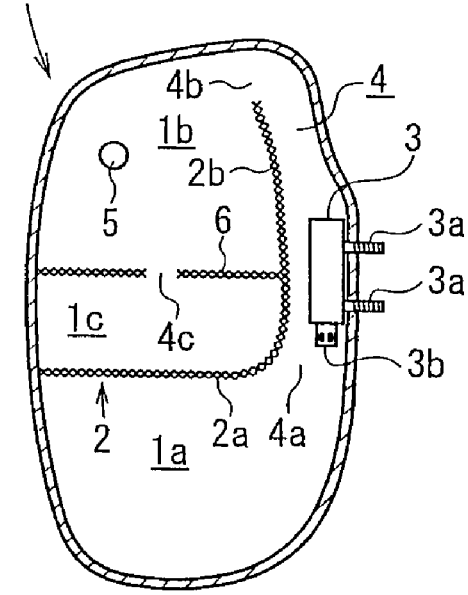
Figure 6:
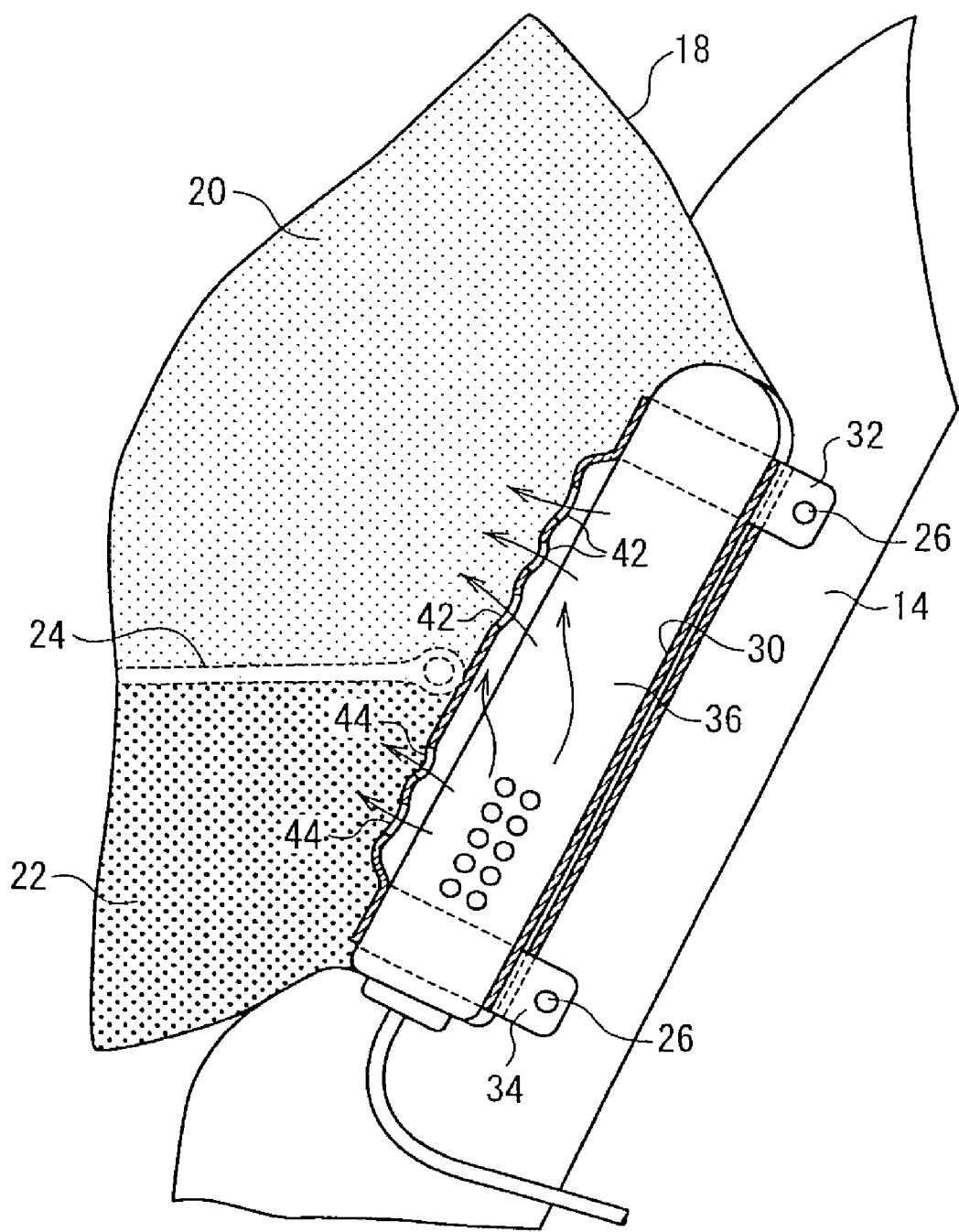
FIG. 6 is a sectional view of the conventional airbag system shown in FIG. 5.

FIGS. 4(a) and 4(b) are sectional views showing airbags 1C and 1D, respectively. Each of the airbags 1C and 1D has a substantially horizontal seam 6, and a middle chamber 1c is provided between the upper chamber 1b and the lower chamber 1a. A front end of the seam 6 is connected to front rims of the airbags 1C and 1D, respectively. In the airbag 1C, the vertical section 2b of the seam 2 has a gas discharge port 4c communicating with the middle chamber 1c between the horizontal section 2a and the seam 6. In the airbag 1D, the gas discharge port 4c is provided in the seam 6.

Other arrangements of the airbags 1C and 1D are the same as those of the airbag 1 shown in FIGS. 1, 2(a) and 2(b). Accordingly, the same reference numerals in FIGS. 4(a) and 4(b) indicate the same components as those in FIGS. 1, 2(a) and 2(b).

In the embodiments shown in FIGS. 4(a) and 4(b), the gas discharge port 4a is directed downwardly in the lower chamber 1a, and the housing chamber 4 extends vertically. Accordingly, when the gas generator 3 is activated, the airbags 1C and 1D are first inflated vertically quickly. In the airbag 1C shown in FIG. 4(a), the gas flows into the middle chamber 1c from the gas discharge port 4c at a rear of the middle chamber 1c. Therefore, the middle chamber 1c is inflated forward quickly. In the airbag 1D shown in FIG. 4(b), when the occupant plunges into the inflated upper chamber 1b, a part of the gas in the upper chamber 1b flows into the middle chamber 1c through the gas discharge port 4c, thereby absorbing an impact applied to the occupant.

Figure 7:
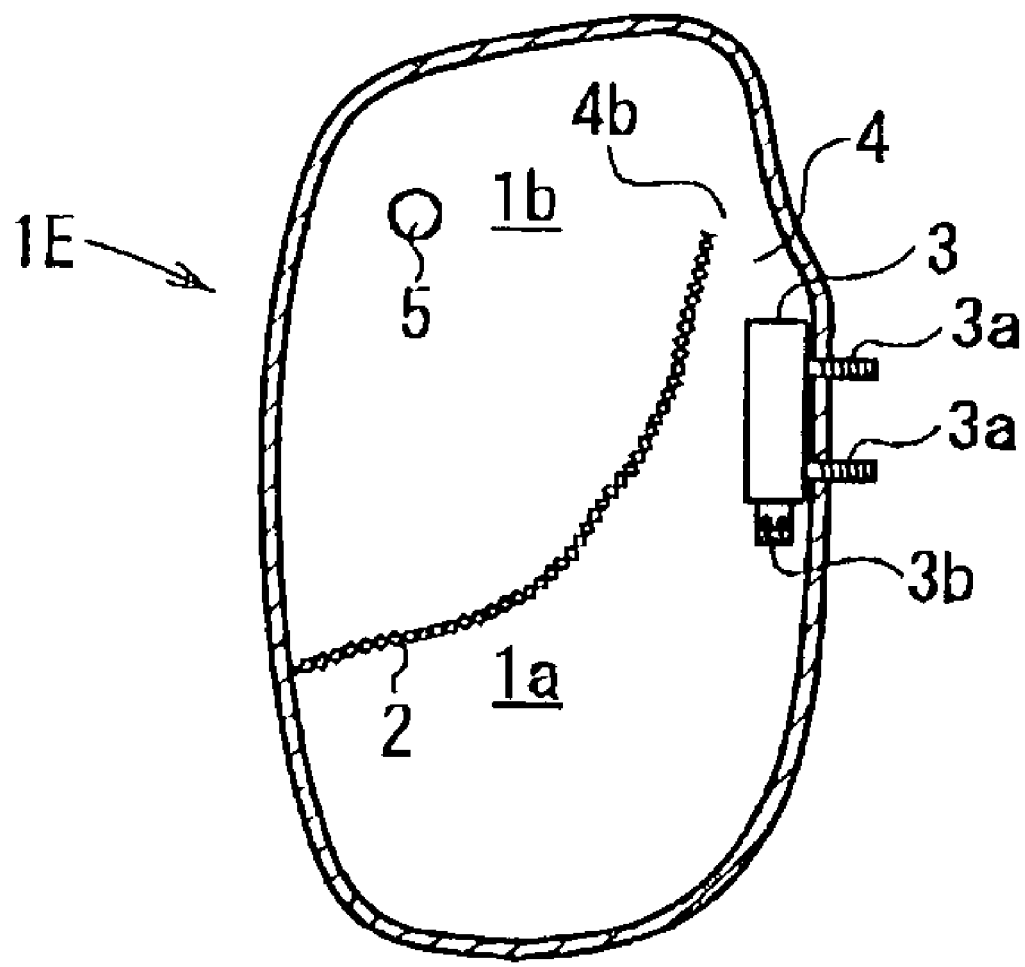
FIG. 7 is a side view of an airbag according to a still further embodiment of the invention.

According to the invention, the seam 24 may extend diagonally, as shown in an airbag 1E in FIG. 7.

The embodiments described above are only examples of the invention and various modifications may be possible in the invention. For example, the invention may include three or more partitioning seams to form four chambers or more.

As described above, the present invention provides the airbag system that can be produced at a low cost. According to the invention, the airbag can be quickly inflated vertically.

While the invention has been explained with reference to the specific embodiments of the invention, the explanation is illustrative and the invention is limited only by the appended claims.

What is claimed is:

1. An airbag system for protecting an occupant, comprising:
    an airbag having an occupant side surface facing the occupant and an opposite side surface opposite to the occupant side surface when the airbag is inflated, said airbag having an interior partitioned into a plurality of chambers including at least an upper chamber and a lower chamber,
    a gas generator disposed in the airbag for generating gas to inflate the airbag,
    a gas distributor disposed in the airbag and partly surrounding the gas generator, said gas distributor having a discharge port for discharging the gas from the gas generator into at least the upper chamber and the lower chamber so as to expand the airbag, said gas distributor having a size greater than that of the gas generator to form a clearance for a gas passage outside the gas generator so that the gas flows between at least the upper chamber and the lower chamber through the clearance, and
    a connecting line having a first section and a second section extending continuously from the first section to define at least said upper chamber, said lower chamber and said gas distributor, said connecting line connecting the occupant side surface and the opposite side surface of the airbag.

2. An airbag system according to claim 1, wherein said airbag includes a housing chamber as the gas distributor between the second section of the connecting line and a rear side rim of the airbag for retaining the gas generator, said discharge port including a lower discharge port communicating with the lower chamber at a lower side of the housing chamber and an upper discharge port communicating with the upper chamber at an upper side of the housing chamber, said lower discharge port having a size larger than that of the upper discharge port.

3. An airbag system according to claim 2, wherein said gas generator has a rod shape having a gas port facing downwardly at one end thereof and disposed vertically in the housing chamber.

4. An airbag system according to claim 3, wherein said housing chamber is disposed between the upper chamber and the rear side rim of the airbag.

5. An airbag system according to claim 3, wherein said airbag is partitioned by said connecting line first section connecting the occupant side surface and the opposite side surface, said connecting line first section extending to said connecting line second section.

6. An airbag system according to claim 5, wherein said connecting line first section extends from a front side rim of the airbag to an end portion near the rear side rim, and said connecting line second section extends from said end portion of said connecting line first section upwardly to end near an upper side rim of the airbag.

7. An airbag system according to claim 6, further comprising a partitioning line disposed above said connecting line first section so as to form a middle chamber between said upper chamber and said lower chamber.

8. An airbag system according to claim 2, wherein said connecting line has a lower part situated close to the rear side rim of the airbag.

9. An airbag system according to claim 1, wherein said first section separates the upper and lower chambers, and said second section separates gas distributor from the upper chamber.

* * * * *